US009250482B2

United States Patent
Hong et al.

(10) Patent No.: US 9,250,482 B2
(45) Date of Patent: Feb. 2, 2016

(54) MANUFACTURING METHOD OF A LIQUID CRYSTAL DISPLAY DEVICE COMPRISING A LIQUID CRYSTAL POLYMER COMPOSITION HAVING GREATER CHEMICAL AFFINITY FOR A FIRST THIN FILM THAN FOR A FIRST ALIGNMENT LAYER

(71) Applicants: Samsung Display Co., Ltd., Yongin (KR); Industry-University Cooperation Foundation, Hanyang University, Seoul (KR)

(72) Inventors: Wang-su Hong, Suwon-si (KR); Jae-hoon Kim, Yongin-si (KR)

(73) Assignees: Samsung Display Co., Ltd., Yongin-si (KR); Industry-University Cooperation Foundation, Hanyang University, Seoul (KR)

( * ) Notice: Subject to any disclaimer, the term of this patent is extended or adjusted under 35 U.S.C. 154(b) by 0 days.

(21) Appl. No.: 14/800,368

(22) Filed: Jul. 15, 2015

(65) Prior Publication Data
US 2015/0316809 A1 Nov. 5, 2015

Related U.S. Application Data

(62) Division of application No. 12/143,255, filed on Jun. 20, 2008, now Pat. No. 9,091,888.

(30) Foreign Application Priority Data

Aug. 10, 2007 (KR) .................. 10-2007-0080663

(51) Int. Cl.
G02F 1/1337 (2006.01)
G02F 1/1339 (2006.01)
(Continued)

(52) U.S. Cl.
CPC .......... *G02F 1/13394* (2013.01); *G02F 1/1337* (2013.01); *G02F 1/133345* (2013.01)

(58) Field of Classification Search
USPC ........................................ 349/128, 156, 183
See application file for complete search history.

(56) References Cited

U.S. PATENT DOCUMENTS

| 5,784,137 A | 7/1998 | Shiomi |
| 6,339,462 B1 * | 1/2002 | Kishimoto .......... G02F 1/13394 349/156 |

(Continued)

FOREIGN PATENT DOCUMENTS

| JP | 8095012 | 4/1996 |
| JP | 08194210 | 7/1996 |

(Continued)

OTHER PUBLICATIONS

Non Final Office Action issued on Oct. 27, 2010, in U.S. Appl. No. 12/143,255.

(Continued)

*Primary Examiner* — Paul Lee
(74) *Attorney, Agent, or Firm* — H.C. Park & Associates, PLC

(57) ABSTRACT

A liquid crystal display device, includes a first substrate including a first insulating substrate, a first thin film positioned on the first insulating substrate, and a first alignment layer positioned on the first thin film and including a first exposing area that exposes the first thin film, a second substrate facing the first substrate and including a second insulating substrate, a spacer positioned between the first substrate and the second substrate and including at least a part that corresponds to the first exposing area, and a liquid crystal layer positioned between the first substrate and the second substrate.

9 Claims, 17 Drawing Sheets

(51) Int. Cl.
*C09K 19/02* (2006.01)
*G02F 1/1333* (2006.01)

(56) References Cited

U.S. PATENT DOCUMENTS

| | | | |
|---|---|---|---|
| 6,864,931 B1 | 3/2005 | Kumar | |
| 2005/0018124 A1 | 1/2005 | Liao | |
| 2006/0139538 A1* | 6/2006 | Park | G02F 1/133784 349/124 |
| 2006/0209246 A1* | 9/2006 | Kim | G02F 1/133377 349/155 |

FOREIGN PATENT DOCUMENTS

| | | |
|---|---|---|
| JP | 09080399 | 3/1997 |
| JP | 09105940 | 4/1997 |
| JP | 20006085068 | 3/2006 |
| KR | 1020020062188 | 7/2002 |
| KR | 1020030048828 | 6/2003 |
| KR | 1020040085298 | 10/2004 |
| KR | 1020050003739 | 1/2005 |
| KR | 1020050064846 | 6/2005 |
| KR | 10-2006-0020537 | 3/2006 |
| KR | 1020060077722 | 7/2006 |
| KR | 1020060077724 | 7/2006 |
| KR | 10-2006-0110936 | 10/2006 |
| KR | 1020070007604 | 1/2007 |

OTHER PUBLICATIONS

Final Office Action issued on Mar. 7, 2011, in U.S. Appl. No. 12/143,255.
Non Final Office Action issued on Jun. 23, 2011, in U.S. Appl. No. 12/143,255.
Final Office Action issued on Oct. 19. 2011, in U.S. Appl. No. 12/143,255.
Examiner's Answer to Appeal Brief issued on Aug. 3, 2012, in U.S. Appl. No. 12/143,255.
Patent Board Decision issued on Dec. 17, 2014, in U.S. Appl. No. 12/143,255.
Notice of Allowance issued on Mar. 18, 2015, in U.S. Appl. No. 12/143,255.

* cited by examiner

MANUFACTURING METHOD OF A LIQUID CRYSTAL DISPLAY DEVICE COMPRISING A LIQUID CRYSTAL POLYMER COMPOSITION HAVING GREATER CHEMICAL AFFINITY FOR A FIRST THIN FILM THAN FOR A FIRST ALIGNMENT LAYER

CROSS-REFERENCE TO RELATED APPLICATIONS

This application is a Divisional of U.S. patent application Ser. No. 12/143,255, filed on Jun. 20, 2008, and claims priority from and the benefit of Korean Patent Application No. 10-2007-0080663, filed on Aug. 10, 2007, each of which is hereby incorporated by reference for all purpose as if fully set forth herein.

BACKGROUND OF THE INVENTION

1. Field of the Invention

The present invention relates to a liquid crystal display device and a manufacturing method thereof, and more particularly, to a flexible liquid crystal display device and a manufacturing method thereof.

2. Discussion of the Background

A liquid crystal display device includes a first substrate, a second substrate facing the first substrate, and a liquid crystal layer interposed between the first substrate and the second substrate.

Optical properties of the liquid crystal display device may be closely correlated with a cell gap, which is distance between the first substrate and the second substrate. For example, the contrast ratio and the viewing angle are known to be dependent on multiplication of double refraction Δn of the liquid crystal molecules and the cell gap. Accordingly, if the cell gap is not uniform, the optical properties thereof may become non-uniform. If the liquid crystal display device is bent, especially in a flexible liquid crystal display device, it may be difficult to maintain a uniform cell gap.

If transformation happens in the flexible liquid crystal display device, the cell gap corresponding to an area where the transformation happens becomes narrower than the cell gap in other areas.

Accordingly, the transmittance of the liquid crystal layer corresponding to the transformed portion may deteriorate, which may deteriorate the brightness uniformity of the liquid crystal display device.

SUMMARY OF THE INVENTION

The present invention provides a liquid crystal display device and a manufacturing method thereof stably maintaining a cell gap.

Additional features of the present invention will be set forth in the description which follows and, in part will be obvious from the description, or may be learned by practice of the present invention.

The present invention discloses a liquid crystal display device including a first substrate, a second substrate, a spacer, and a liquid crystal layer. The first substrate includes a first insulating substrate, a first thin film positioned on the first insulating substrate, and a first alignment layer positioned on the first thin film and including a first exposing area that exposes the first thin film. The second substrate faces the first substrate and includes a second insulating substrate. The spacer is positioned between the first substrate and the second substrate and includes at least a part that corresponds to the first exposing area. The liquid crystal layer is positioned between the first substrate and the second substrate.

The present invention also discloses a manufacturing method of a liquid crystal display device, including providing a first substrate and providing a second substrate. The first substrate includes a first insulating substrate, a first thin film positioned on the first insulating substrate, and a first alignment layer positioned on the first thin film to include a first exposing area that exposes the first thin film. The second substrate includes a second insulating substrate and a second alignment layer disposed on the second insulating substrate. The method further includes positioning a liquid crystal polymer composition, which includes a polymer having greater chemical affinity for the first thin film than for the first alignment layer and a liquid crystal molecule having greater chemical affinity for the first alignment layer than for the first thin film on one of the first substrate and the second substrate, on one of the first substrate and the second substrate the liquid crystal polymer composition, disposing one of the first substrate and the second substrate on the other of the first substrate and the second substrate, and curing the liquid crystal polymer composition to form a spacer after the polymer of the liquid crystal polymer composition becomes concentrated in an area corresponding to the first exposing area.

The present invention discloses a manufacturing method of a liquid crystal display device, including providing a first substrate and providing a second substrate. The first substrate includes a first insulating substrate, a thin film positioned on the first insulating substrate, and a first alignment layer positioned on the thin film and including a first exposing area that exposes the thin film. The second substrate includes a second insulating substrate. The method further includes disposing the second substrate on the first substrate so that the first substrate and the second substrate face each other with a space therebetween, disposing a liquid crystal polymer composition in the space, the liquid crystal polymer composition including a polymer having greater chemical affinity for the thin film than to the first alignment layer and a liquid crystal molecule having greater chemical affinity for the first alignment layer than for the thin film, and curing the liquid crystal polymer composition to form a spacer after the polymer of the liquid crystal polymer composition becomes concentrated in an area corresponding to the first exposing area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further explanation of the invention and are incorporated in and constitute a part of this specification, illustrate embodiments of the invention, and together with the description serve to explain the principles of the invention.

DETAILED DESCRIPTION OF ILLUSTRATED EMBODIMENTS

Figure 1:
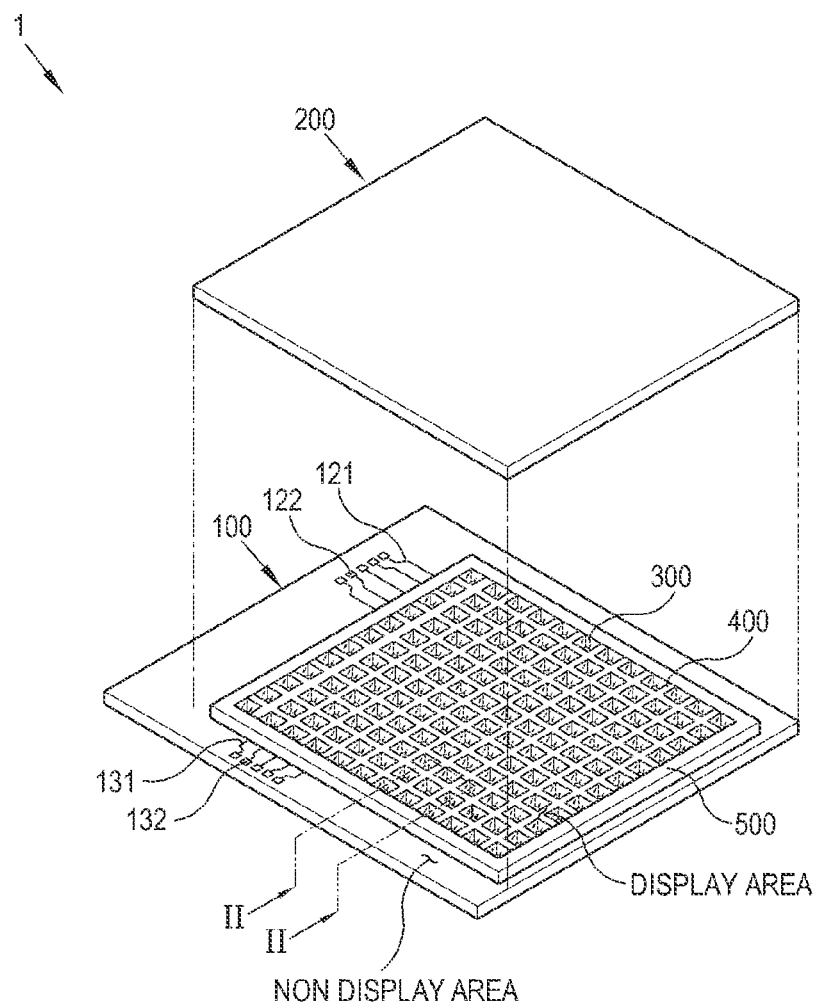
FIG. 1 is an exploded perspective view of a liquid crystal display device according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, a liquid crystal display device 1 according to a first exemplary embodiment of the present invention will be described by referring to FIG. 1 and FIG. 2.

As shown in FIG. 1, the liquid crystal display device 1 according to the first exemplary embodiment of the present invention includes a first substrate 100, a second substrate 200, a spacer 300, a liquid crystal layer 400, and a sealant 500.

The first substrate 100 is bigger than the second substrate 200, the area inside the sealant 500 is a display area, and the area outside of the sealant 500 is a non-display area. The first substrate 100 includes a gate line 121 extending to the display area, a gate pad 122 connected to the gate line 121 and positioned to the non display area, a data line 131 extending to the display area, and a data pad 132 connected to the data line 131 and positioned in the non display area.

Figure 2:
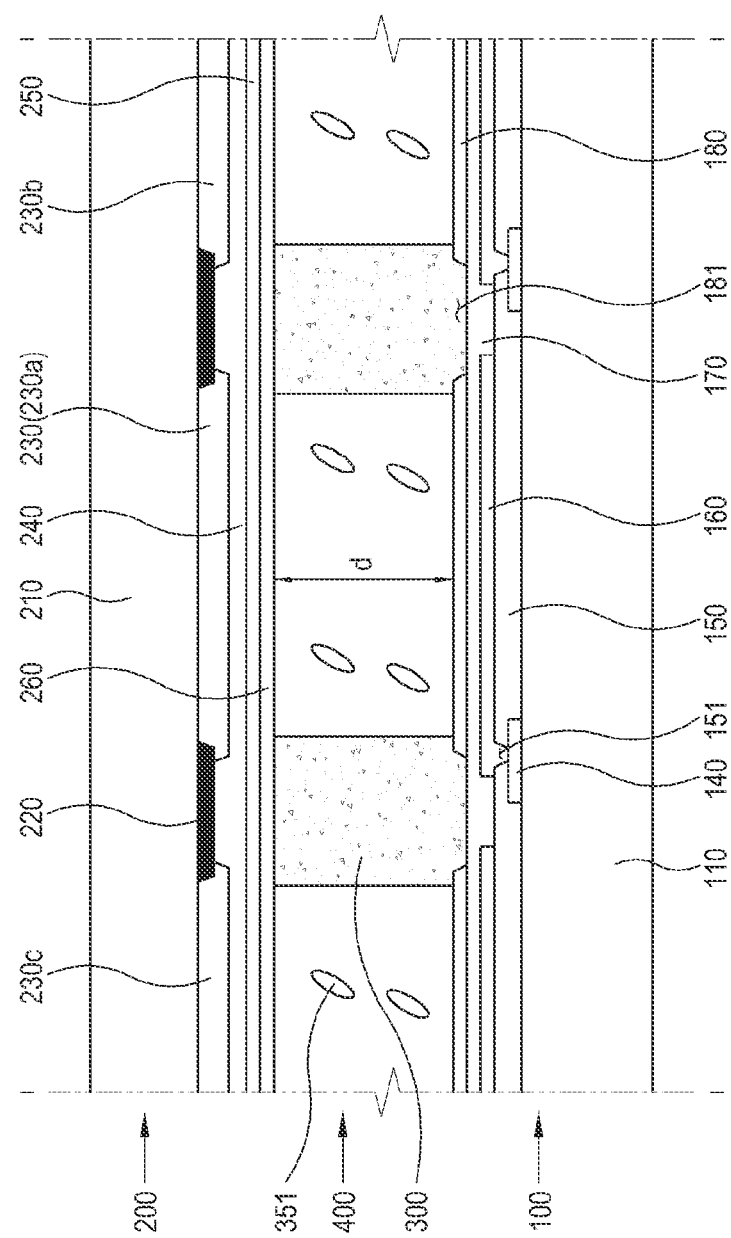
FIG. 2 is a sectional view taken along line II-II of FIG. 1.

The gate line 121 and the data line 131 are connected to a thin film transistor 140, which is shown in FIG. 2. The gate line 121 applies a gate signal (a gate on voltage and a gate off voltage) to the thin film transistor 140, and the data line 131 applies a data voltage to the thin film transistor 140.

The gate pad 122 and the data pad 132 are respectively applied with the gate signal and the data voltage from an external unit.

Alternatively, the gate pad 122 may be omitted.

The second substrate 200 is positioned on the first substrate 100 to face the first substrate 100.

The spacer 300 and the liquid crystal layer 400 are positioned in the display area. The spacer 300 uniformly maintains a cell gap, that is, an interval between the first substrate 100 and the second substrate 200, together with the sealant 500. The spacer 300 will be described in detail by referring to FIG. 2.

The sealant 500 attaches the first substrate 100 and the second substrate 200, and surrounds the liquid crystal layer 400 together with the first substrate 100 and the second substrate 200. The sealant 500 is disposed in the non-display area around the display area and may include a photoresist material.

The liquid crystal display device 1 according to the first exemplary embodiment of the present invention will be described in more detail by referring to FIG. 2.

At first, related to the first substrate 100, the thin film transistor 140 is disposed on a first insulating substrate 110. The thin film transistor 140 is connected to the gate line 121 and the data line 131.

An insulating layer 150 is disposed on the thin film transistor 140. A contact hole 51 is formed in the insulating layer 150 to expose the thin film transistor 140.

A pixel electrode 160 is positioned on the insulating layer 150.

The pixel electrode 160 may include a transparent conductive material such as indium tin oxide (ITO), indium zinc oxide (IZO), or the like, and is connected to the thin film transistor 140 through the contact hole 151.

A first thin film 170 is positioned on the pixel electrode 160.

Figure 8:
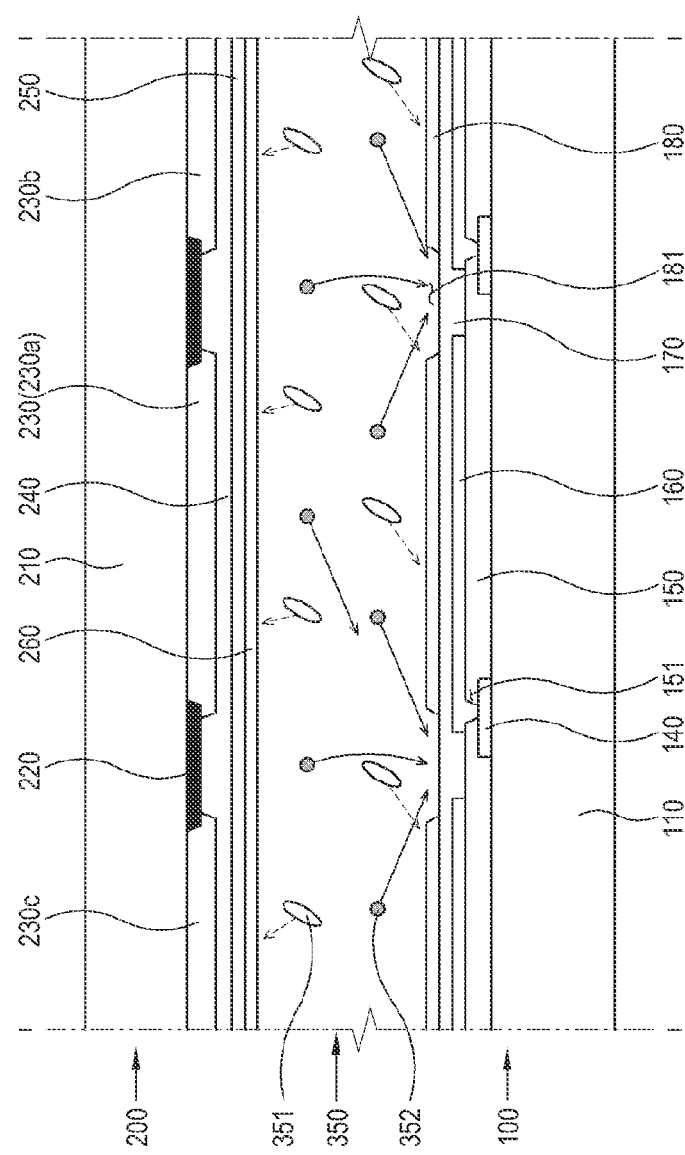

The first thin film 170 may be positioned over the entire display area of the liquid crystal display device 1 and has greater chemical affinity for a polymer 352 than for liquid crystal molecules 351 contained in a liquid crystal polymer composition 350 shown in FIG. 8. For example, if the polymer 352 is NOA65®, an ultraviolet ray curable adhesive made by Norland in America, and the liquid crystal molecule 351 is MLC6610®, a liquid crystal mixture made by Merck in Germany, the first thin film 170 may be AL1H659®, a polyimide material made by JSR in Japan.

A first alignment layer 180 including a first exposing area 181 exposing the first thin film 170 is positioned on the first thin film 170.

The first alignment layer 180 is arranged in a matrix by the lattice-shaped openings of the first exposing area 181, and determines an alignment direction of the liquid crystal molecules 351 of the liquid crystal layer 400. The first alignment layer 180 may include polyimide, silicon oxide, or the like, and has greater chemical affinity for the liquid crystal molecules 351 than for the polymer 352 contained in the liquid crystal polymer composition 350. For example, if the polymer 352 is NOA65®, and the liquid crystal molecules 351 are MLC6610®, the first alignment layer 180 may be JALS684®, a vertical alignment layer made by JSR in Japan.

The second substrate 200 may include a black matrix 220 disposed on the second insulating substrate 210.

The black matrix 220 may have a lattice shape and prevents an external light from being supplied to a channel area of the thin film transistor 140. The black matrix 220 may include chromium oxide or an organic material including a black pigment.

A color filter 230 is disposed between the black matrixes 220. The color filter 230 includes three sub layers 230a, 230b, and 230c sequentially and repeatedly arranged and having different colors.

An over coat layer 240 is disposed on the color filter 230 and the black matrixes 220. The over coat layer 240 supplies a planar surface and protects the color filter 230.

A common electrode 250 is disposed on the over coat layer 240. The common electrode 250 may include a transparent conductive material such as ITO, IZO, or the like, and applies a voltage to the liquid crystal layer 400 together with the pixel electrode 160 to adjust an arrangement state of the liquid crystal layer 400.

A second alignment layer 260 is disposed on the common electrode 250.

The second alignment layer 260 determines the alignment direction of the liquid crystal molecules 351 contained in the liquid crystal layer 400 together with the first alignment layer 180. The second alignment layer 260 may be patterned to enable the liquid crystal molecules 351 to be horizontally aligned or vertically aligned together with the first alignment layer 180. The second alignment layer 260 may be positioned over the entire second insulating substrate 210.

The second alignment layer 260 may include polyimide, silicon oxide, or the like, and has greater chemical affinity for the liquid crystal molecules 351 than for the polymer 352 contained in the liquid crystal polymer composition 350. For example, if the polymer 352 is NOA65®, and the liquid crystal molecules 351 are MLC6610®, the second alignment layer 260 may be JALS684®.

The spacer 300 is positioned to correspond to the first thin film 170 exposed by the first exposing area 181 of the first alignment layer 180. The spacer 300 directly contacts the surfaces of the first substrate 100 and the second substrate 200. The spacer 300 has a lattice shape corresponding to the first exposing area 181, and the liquid crystal layer 400 is divided by the spacer 300.

The spacer 300 maintains the cell gap due to the contact of the lattice shape with the surfaces of the first substrate 100 and the second substrate 200.

The spacer 300 may include an ultraviolet ray curable resin such as an acrylic resin and may further include an epoxy resin, which may include thermal curable resin, a hardener of an amine series, and a filler such as alumina powder. The spacer 300 has greater chemical affinity for the first thin film 170 than for the first alignment layer 180. For example, if the first alignment layer 180 is JALS684®, and the first thin film 170 is AL1H659®, the spacer 300 may be NOA65®.

The liquid crystal layer 400 is positioned in a space defined by the spacer 300, the first substrate 100, and the second substrate 200.

The liquid crystal layer 400 includes the liquid crystal molecules 351, and it directly contacts the first alignment layer 180 and the second alignment layer 260, which determine the alignment direction of the liquid crystal molecules 351.

The liquid crystal molecules 351 of the liquid crystal layer 400 may be nematic, smectic, or cholesteric liquid crystals, and have greater chemical affinity for at least one of the first alignment layer 180 and the second alignment layer 260 than for the first thin film 170. For example, if the first alignment layer 180 and the second alignment layer 260 are JALS684®, and the first thin film 170 is AL1H659®, the liquid crystal molecules 351 may be MLC6610®.

Hereinafter, a method of manufacturing the liquid crystal display device 1 according to the first exemplary embodiment of the present invention will be described referring to FIG. 2, FIG. 3, FIG. 4, FIG. 5, FIG. 6, FIG. 7, FIG. 8, and FIG. 9.

Figure 3:
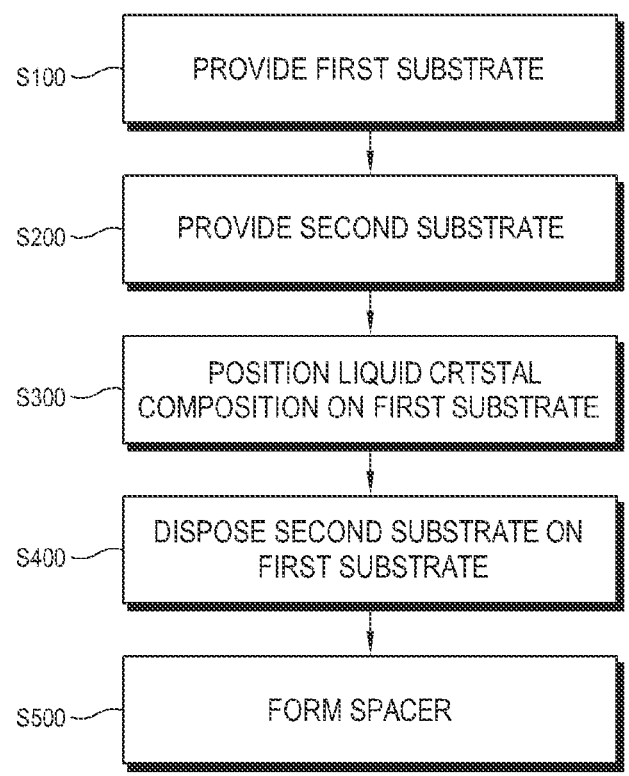
FIG. 3 is a flowchart showing a method of manufacturing the liquid crystal display device according to the first exemplary embodiment of the present invention.
Figure 4:
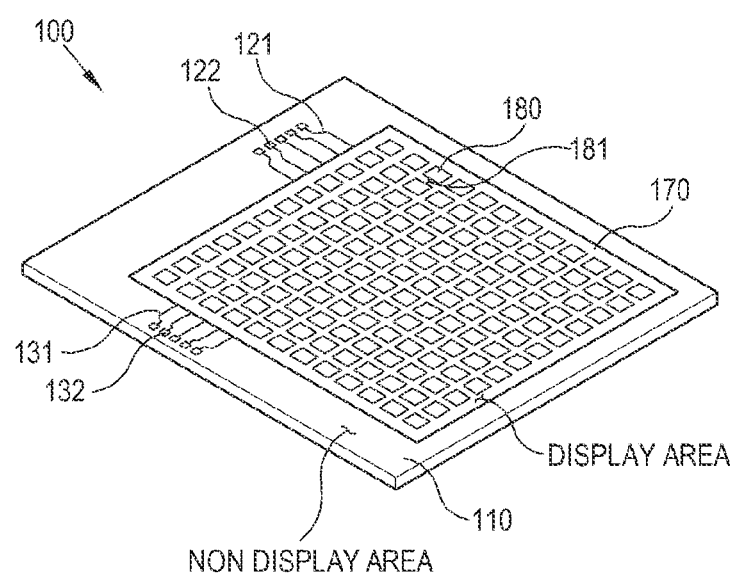
FIG. 4, FIG. 5, FIG. 6, FIG. 7, FIG. 8, and FIG. 9 describe the method of manufacturing the liquid crystal display device according to the first exemplary embodiment of the present.

As shown in FIG. 3, the manufacturing method of the liquid crystal display device 1 according to the first exemplary embodiment of the present invention includes providing the first substrate 100 (S100), providing the second substrate 200 (S200), positioning the liquid crystal polymer composition 350 on the first substrate 100 (S300), disposing the second substrate 200 on the first substrate 100 (S400), and curing the liquid crystal polymer composition to form the spacer 300 (S500). Initially, as shown in FIG. 4, the first substrate 100 is provided (S100).

After the gate line 121, the data line 131, the gate pad 122, the data pad 132, the thin film transistor 140, the insulating layer 150, and the pixel electrode 160 are disposed on the first insulating substrate 100, the first thin film 170 is disposed in the display area.

The first thin film 170 may be formed through an ink jetting method, a flexo printing method, or the like.

The first alignment layer 180 is disposed on the first thin film 170. The first alignment layer 180 is arranged in a matrix by the lattice-shaped openings of the first exposing area 181 to expose the first thin film 170.

The first alignment layer 180 may be formed through a micro contact printing method using a mold or through the same method as the first thin film 170. Then, an alignment pattern such as a vertical alignment, a horizontal alignment, or the like may be formed in the first alignment layer 180 through a rubbing method or the like.

Figure 5:
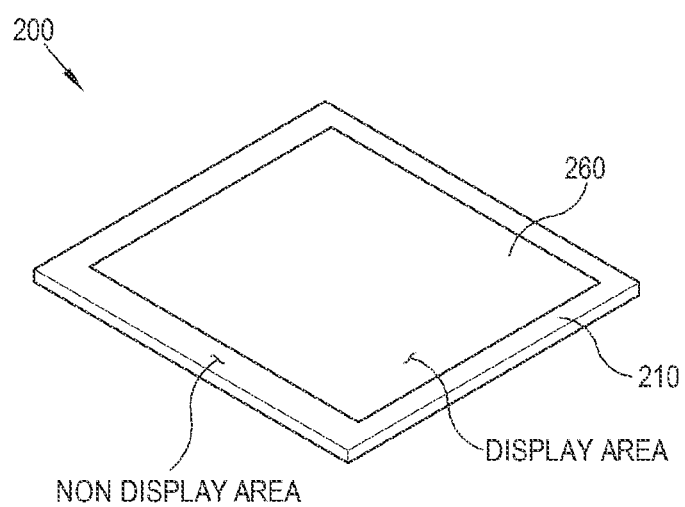

Then, as shown in FIG. 5, the second substrate 200 is formed (S200).

After the black matrix 220, the color filter 230, the over coat layer 240, and the common electrode 250 are disposed on the second insulating substrate 210, the second alignment layer 260 is disposed in the display area.

The second alignment layer 260 may be disposed over the entire display area and may be formed through the ink jetting method, the flexo printing method, or the like. Then, an alignment pattern such as a vertical alignment pattern, a horizontal alignment pattern, or the like may be formed in the second alignment layer 260 through the rubbing method or the like.

The order in which the first substrate 100 and the second substrate 200 are formed may vary. For example, the second substrate 200 may be formed before forming the first substrate 100, or the first substrate 100 and the second substrate 200 may be concurrently formed.

Then, the liquid crystal polymer composition 350 is positioned on the first substrate 100 (S300).

Figure 6:
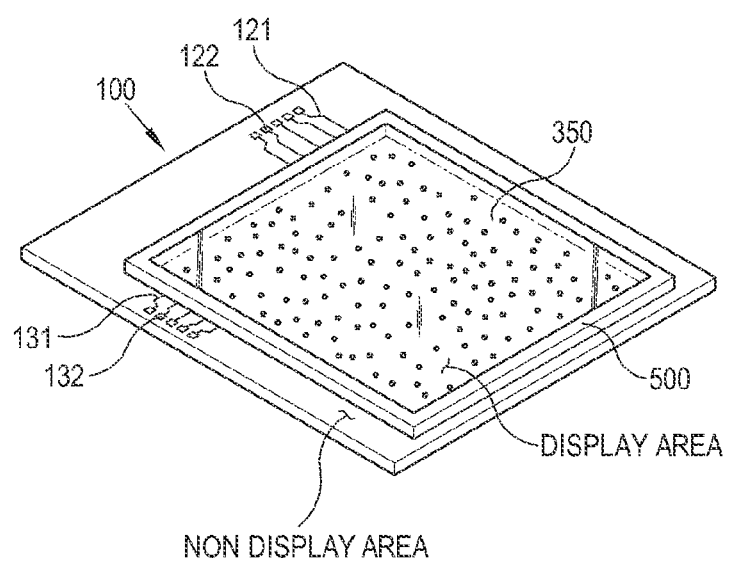

As shown in FIG. 6, the sealant 500 having a close loop shape is arranged around the display area on the first substrate 100.

The sealant 500 includes a light curable material, a thermal curable material, or the like, and may be formed through a screen mask method, a dispense method, or the like.

Then, the liquid crystal polymer composition 350 is positioned on the display area of the first substrate 100, which the sealant 500 surrounds, through a dropping method.

The liquid crystal polymer composition 350 includes the polymer 352, shown in FIG. 8, having greater chemical affinity for the first thin film 170 than for the first alignment layer 180, and the liquid crystal molecules 351, shown in FIG. 8, having greater chemical affinity for the first alignment layer 180 and the second alignment layer 260 than for the first thin film 170. The polymer 352 may include an ultraviolet ray curable resin.

Alternatively, the sealant 500 may be arranged around the display area of the second substrate 200, and the liquid crystal polymer composition 350 may be positioned on the second substrate 200.

Then, the second substrate 200 is disposed on the first substrate 100 (S400). Alternatively, the first substrate 100 may be disposed the second substrate 200.

Figure 7:
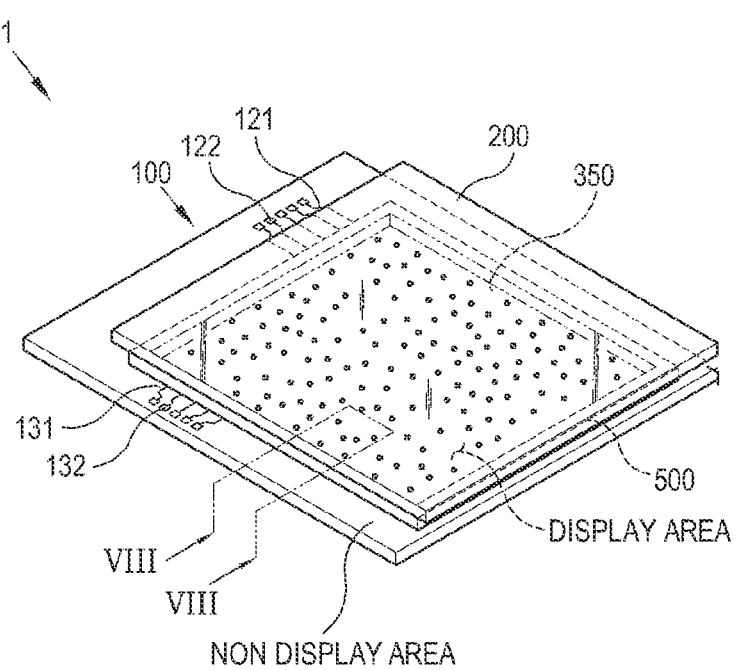

As shown in FIG. 7, the second substrate 200 is disposed on the first substrate 100 so that the first alignment layer 180 and the second alignment layer 260 face each other with the liquid crystal polymer composition 350 interposed therebetween.

Then, the liquid crystal polymer composition 350 is cured to form the spacer 300 (S500). This operation will be described by referring to FIG. 8 and FIG. 9.

As shown in FIG. 8, the polymer 352 and the liquid crystal molecules 351 contained in the liquid crystal polymer composition 350 interposed between the first substrate 100 and the second substrate 200 respectively move toward the first exposing area 181 and the first alignment layer 180 due to different chemical affinities.

Since the polymer 352 has greater chemical affinity for the first thin film 170 than for the first alignment layer 180 and the second alignment layer 260, the polymer 352 moves toward the portion of the first thin film 170 that is exposed by the first exposing area 181.

Since the liquid crystal molecules 351 have greater chemical affinity for the first alignment layer 180 and the second alignment layer 260 than for the first thin film 170, the liquid crystal molecules 351 moves to toward the first alignment layer 180 and the second alignment layer 260.

Figure 9:
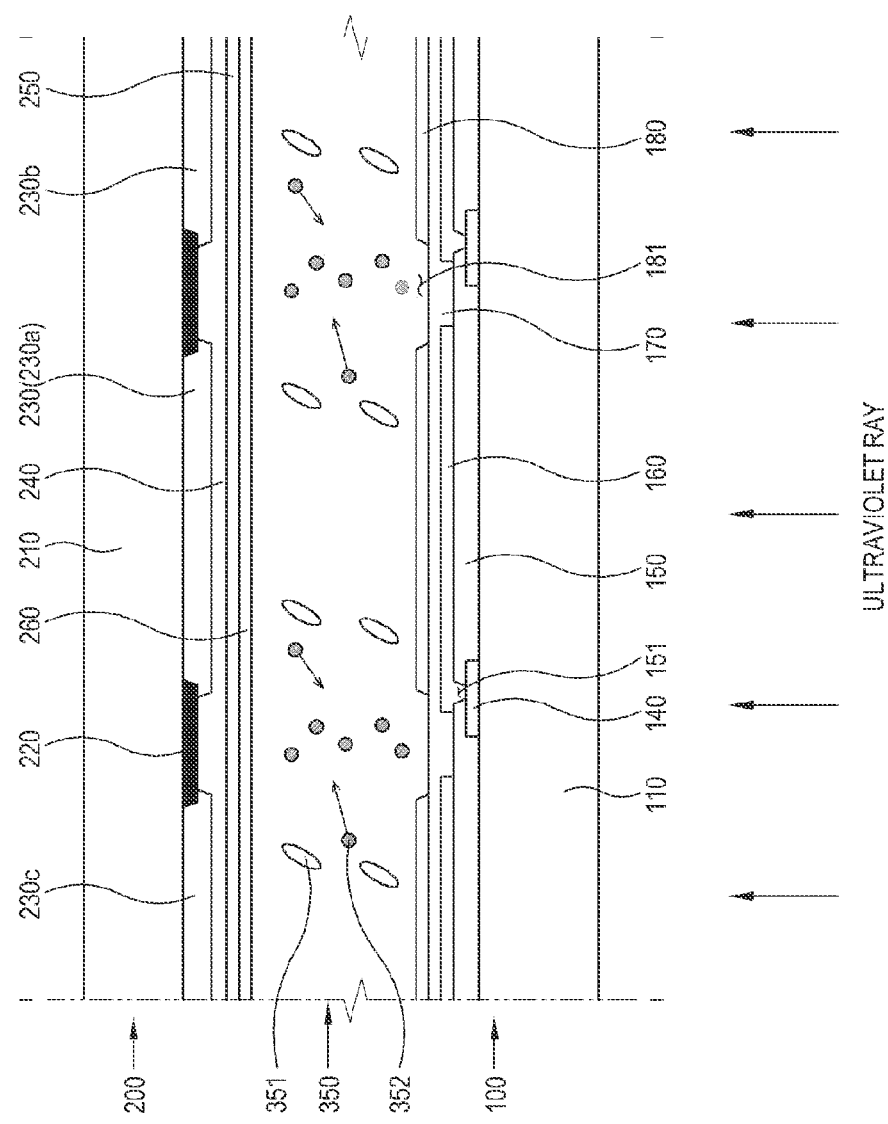

As shown in FIG. 9, after the polymer 352 becomes more concentrated in an area corresponding to the first exposing area 181 than in an area corresponding to the first alignment layer 180, an ultraviolet ray is irradiated toward the liquid crystal polymer composition 350 from an external part of at least one of the first substrate 100 and the second substrate 200.

The polymer 352 in the area corresponding to the first exposing area 181 is cured by the ultraviolet ray irradiated to the liquid crystal polymer composition 350, and the polymer 352 remaining in the area corresponding to the first alignment layer 180 moves toward the polymer 352 in the area corresponding to the first exposing area 181 due to the chemical affinity between the vicinal polymers 352 to be cured.

As described above, the polymer 352 is concentrated in the area corresponding to the first exposing area 181 to be cured to form the spacer 300. The spacer 300 contacts the surfaces of the first substrate 100 and the second substrate 200. Accordingly, the first substrate 100 and the second substrate 200 may be fixedly attached by the spacer 300.

Hereinafter, a case in which the liquid crystal display device 1 is elastically transformed will be described by referring to FIG. 2 and FIG. 10.

The first insulating substrate 110 and the second insulating substrate 210 may include glass, quartz, or plastic. For example, for the plastic, polycarbonate, polyimide, polyethersulfone (PES), polyarylate (PAR), polyethylenenaphthalate (PEN), or polyethyleneterephthalate (PET) may be employed.

If the first insulating substrate 110 and the second insulating substrate 210 include plastic, the liquid crystal display device 1 may be flexible. Accordingly, it may be difficult to maintain a uniform cell gap. Also, if the liquid crystal display device 1 is elastically transformed, the cell gap in an area corresponding to the location of the elastic transformation becomes narrower than the cell gap in other areas of the display.

Accordingly, the transmittance of the liquid crystal layer 400 in an area corresponding to the elastically transformed portion may deteriorate, which may partially deteriorate the brightness of the liquid crystal display device 1.

However, as shown in FIG. 2, since the spacer 300 fixedly contacts the surfaces of the first substrate 100 and the second substrate 200, even if the first insulating substrate 110 and the second insulating substrate 210 include flexible plastic, the cell gap d between the first substrate 100 and the second substrate 200 may be stably maintained by the spacer 300, thereby minimizing the non-uniformity of the space between the first substrate 100 and the second substrate 200.

Figure 10:
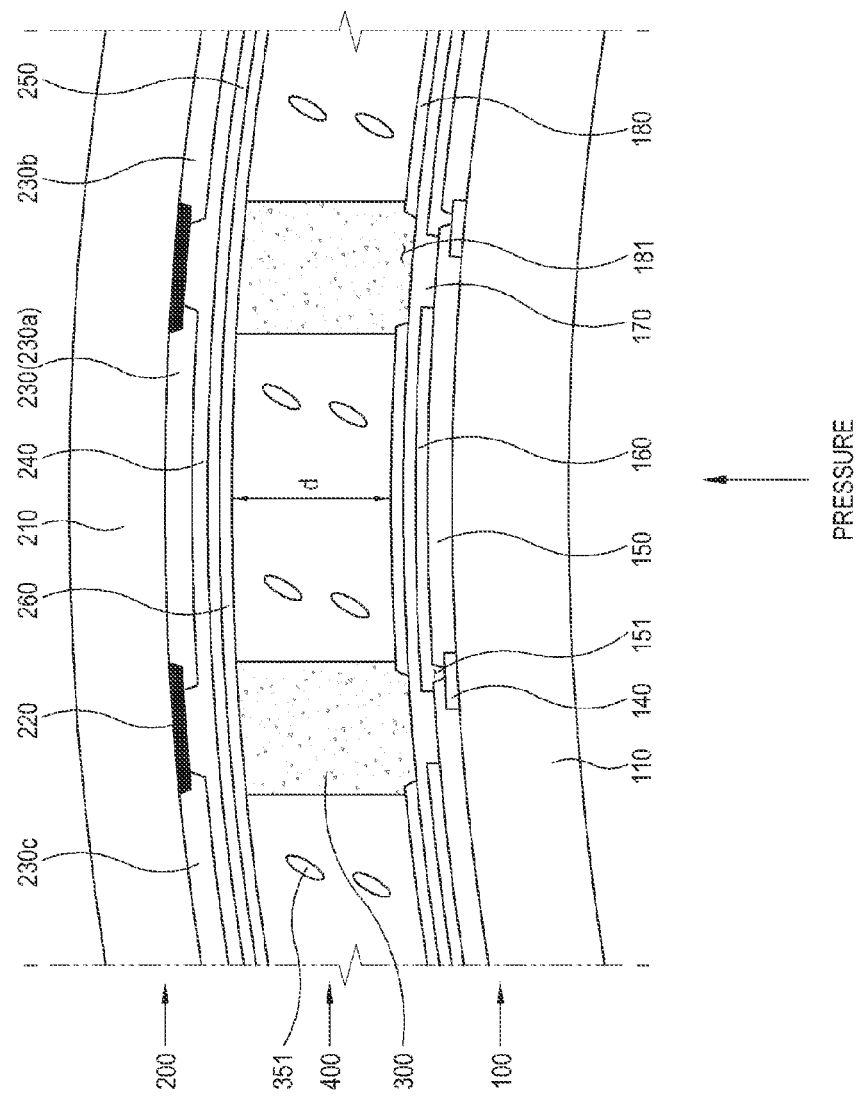
FIG. 10 is a sectional view showing transformation of the liquid crystal display device according to the first exemplary embodiment of the present invention.

Also, as shown in FIG. 10, if the liquid crystal display device 1 is transformed, the cell gap d corresponding to the transformed portion may be maintained by the spacer 300. Accordingly, although the transformation may occur, the brightness may be uniformly maintained over the entire liquid crystal display device 1.

Although the liquid crystal layer 400 corresponding to each pixel electrode 160 is divided by the spacer 300 having the lattice shape, a portion of the liquid crystal layer 400 is compactly positioned in each space defined by the first substrate 100, the second substrate 200, and the spacer 300.

Hereinafter, a liquid crystal display device and a manufacturing method thereof according to a second exemplary embodiment of the present invention, and a liquid crystal display device according to a third exemplary embodiment of the present invention will be described.

Hereinafter, a distinct part from the first exemplary embodiment may be described, and the configuration of the first exemplary embodiment and a known configuration may be applied to a part about which the description is omitted.

Figure 11:
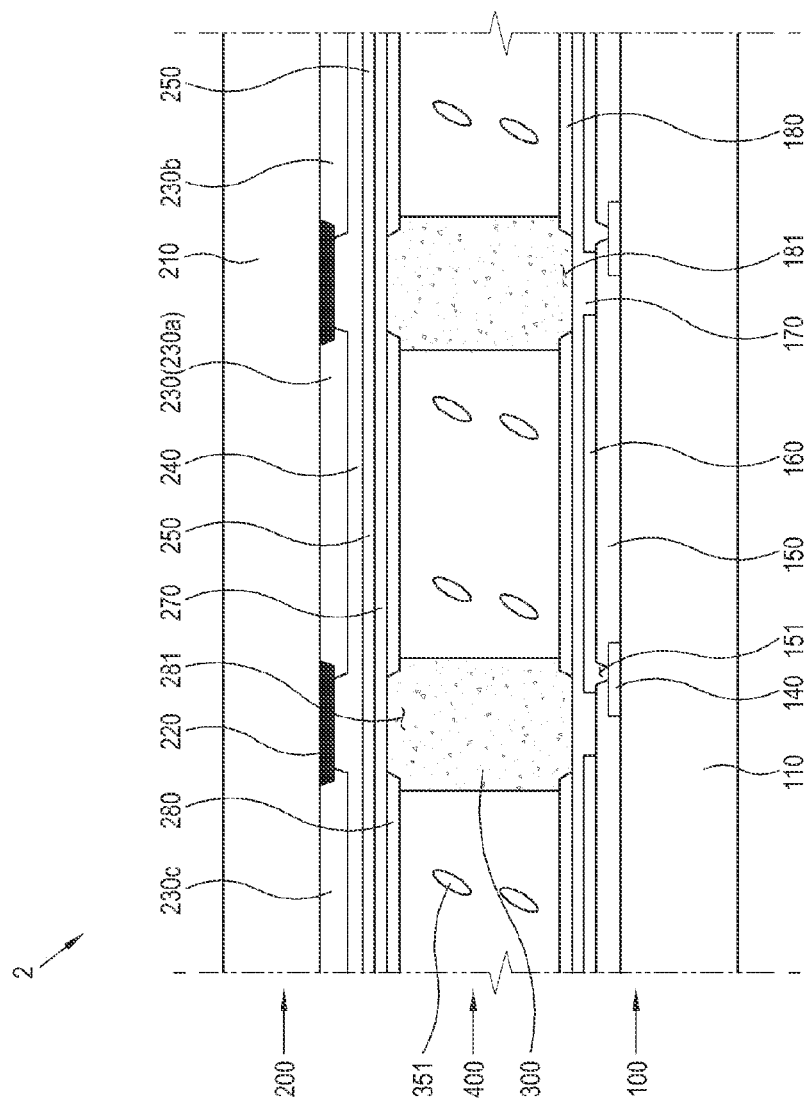
FIG. 11 is a sectional view of a liquid crystal display device according to a second exemplary embodiment of the present invention.

Initially, a liquid crystal display device 2 according to the second exemplary embodiment of the present invention will be described by referring to FIG. 11.

The second substrate 200 includes a black matrix 220, a color filter 230, an over coat layer 240, and a common electrode 250 disposed on a second insulating substrate 210.

A second thin film 270 is disposed on the common electrode 250.

Figure 14:
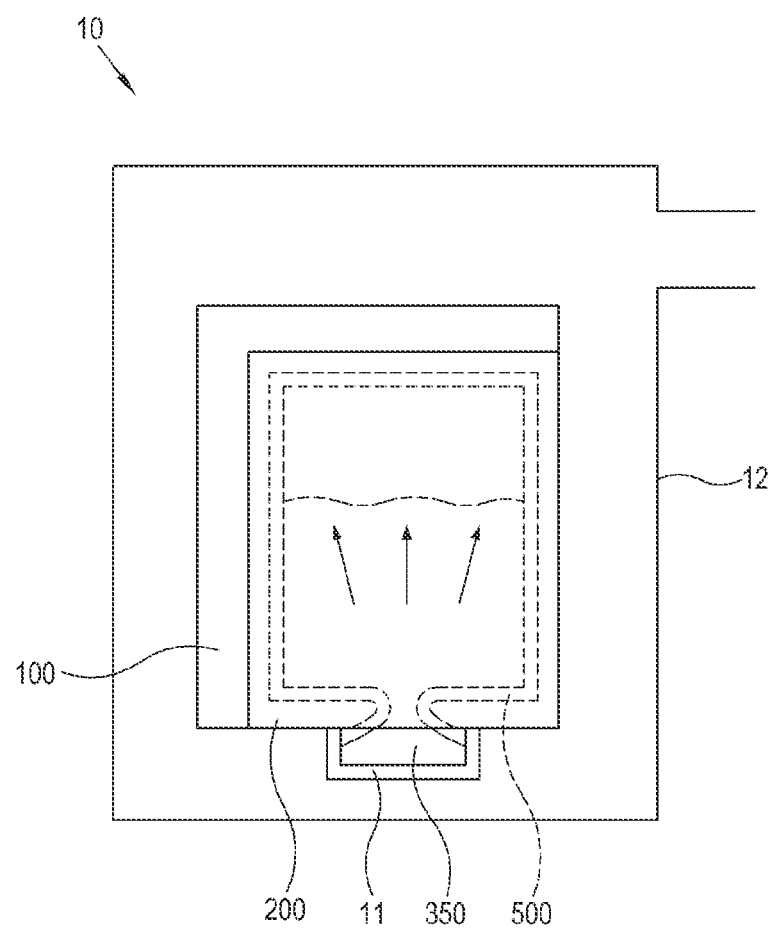

The second thin film 270 is positioned over the entire display area of the liquid crystal display device 2 and has greater chemical affinity for a polymer 352 than for liquid crystal molecules 351 contained in a liquid crystal polymer composition 350, as shown in FIG. 14.

A third alignment layer 280 having a second exposing area 281 exposing the second thin film 270 is positioned on the second thin film 270. The second exposing area 281 is positioned to correspond to a first exposing area 181.

The third alignment layer 280 is disposed in a matrix by the lattice-shaped openings of the second exposing area 281, and it determines an alignment direction of the liquid crystal molecules 351 of a liquid crystal layer 400. The third alignment layer 280 may include polyimide, silicon oxide, or the like, and has greater chemical affinity for the liquid crystal molecules 351 than for the polymer 352 contained in the liquid crystal polymer composition 350.

The third alignment layer 280 determines the alignment direction of the liquid crystal molecules 351 contained in the liquid crystal layer 400 together with the first alignment layer 180. The third alignment layer 280 may be patterned to enable the liquid crystal molecules 351 to be horizontally aligned or vertically aligned with the first alignment layer 180.

A spacer 300 is positioned in an area corresponding to the second thin film 270 exposed by the second exposing area 281 of the third alignment layer 280, and the first thin film 170 exposed by the first exposing area 181 of the first alignment layer 180. The spacer 300 directly contacts with surfaces of the first substrate 100 and the second substrate 200. The spacer 300 has a lattice shape corresponding to the first exposing area 181 and the second exposing area 281, and the liquid crystal layer 400 is divided by the spacer 300. At least a part of the spacer 300 is positioned to correspond to the first thin film 170 and the second thin film 270.

The spacer 300 maintains a cell gap due to the contact of the lattice shape with surfaces of the first substrate 100 and the second substrate 200.

Hereinafter, the manufacturing method of the liquid crystal display device 2 according to the second exemplary embodiment of the present invention will be described by referring to FIG. 11, FIG. 12, FIG. 13, FIG. 14, FIG. 15, and FIG. 16.

Figure 12:
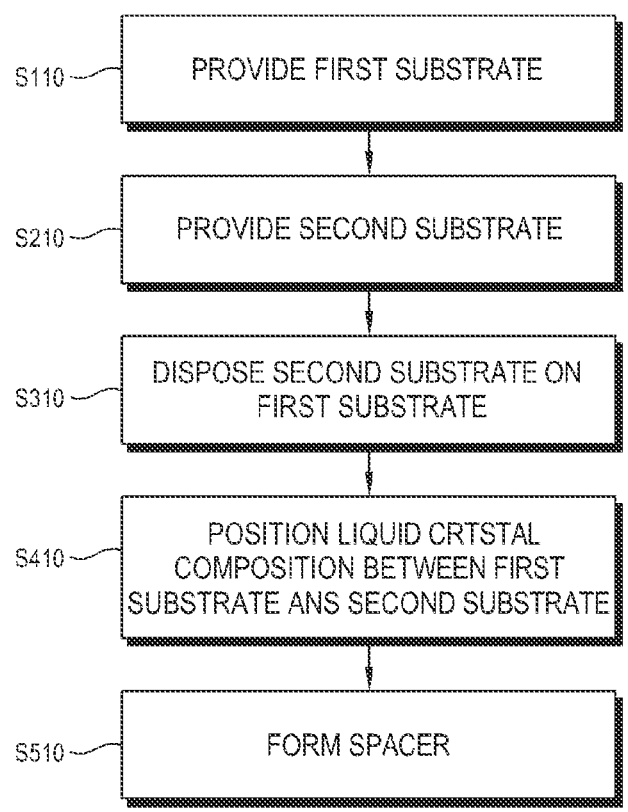
FIG. 12 is a flowchart showing a manufacturing method of the liquid crystal display device according to the second exemplary embodiment of the present invention.

As shown in FIG. 12, the manufacturing method of the liquid crystal display device 2 according to the second exemplary embodiment of the present invention includes providing the first substrate 100 (S110), providing the second substrate 200 (S210), disposing the second substrate 200 on the first substrate 100 (S310), positioning the liquid crystal polymer composition 350 between the first substrate 100 and the second substrate 200 (S410), and curing the liquid crystal polymer composition to form the spacer 300 (S510).

Initially, the first substrate 100 and the second substrate 200 are provided (S110 and S210).

Figure 13:
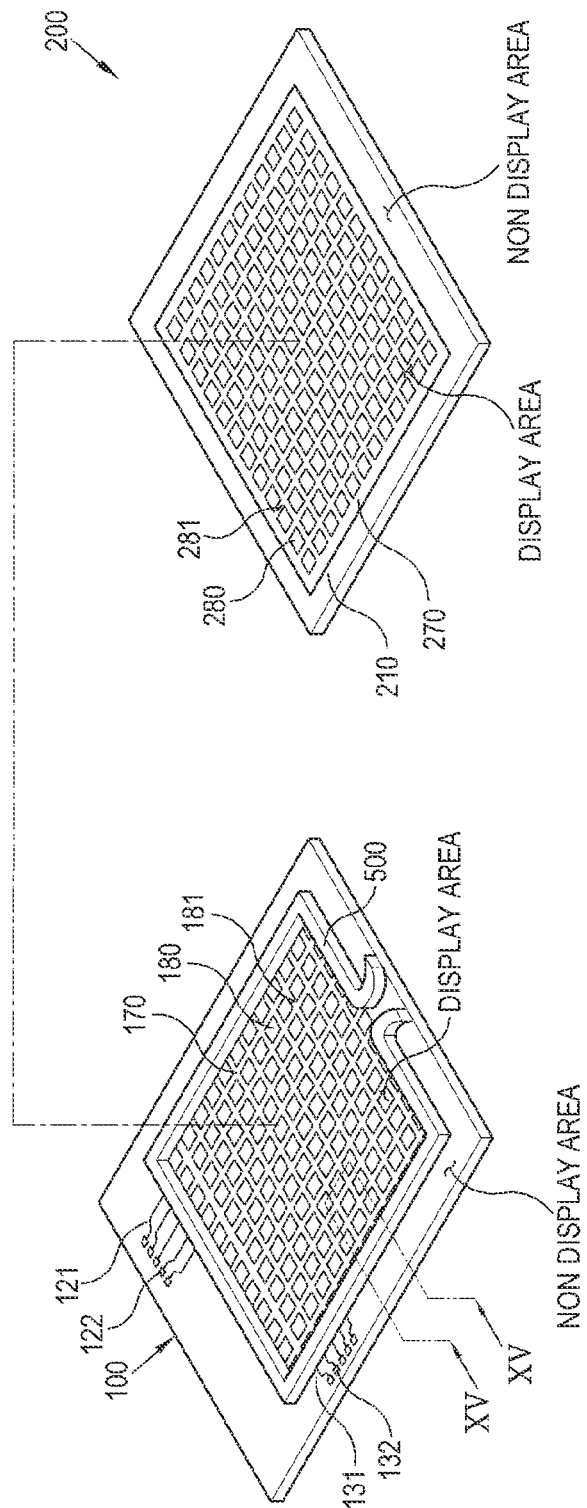
FIG. 13, FIG. 14, FIG. 15, and FIG. 16 describe the method of manufacturing the liquid crystal display device according to the second exemplary embodiment of the present.

As shown in FIG. 13, the first substrate 100 may be formed by the same method as in the first exemplary embodiment. After the black matrix 220, the color filter 230, the over coat layer 240, and the common electrode 250 are disposed on a second insulating substrate 210 of the second substrate 200, the second thin film 270 is disposed in the display area.

The second thin film 270 may be formed through an ink jetting method, a flexo printing method, or the like.

The third alignment layer 280 is disposed on the second thin film 270. The third alignment layer 280 is arranged in a matrix by the lattice-shaped openings of the second exposing area 281 to expose the second thin film 270.

The third alignment layer 280 may be formed through a micro contact printing method using a mold, or may be formed through the same method as the second thin film 270. Then, an alignment pattern such as a vertical alignment pattern, a horizontal alignment pattern, or the like may be formed in the third alignment layer 280 through a rubbing method or the like.

The order in which the first substrate 100 and the second substrate 200 are formed may vary. For example, the second substrate 200 may be formed before forming the first substrate 100, or the first substrate 100 and the second substrate 200 may be concurrently formed.

Then, the second substrate 200 is disposed on the first substrate 100 (S310).

As shown in FIG. 13, a sealant 500 having an open loop shape to surround the display area is disposed on the first substrate 100. Alternatively, the sealant 500 may be disposed on the second substrate 200.

Then, the second substrate 200 is disposed on the first substrate 100 so that the first alignment layer 180 and the third alignment layer 280 face each other and are spaced apart to define a space therebetween.

Then, the liquid crystal polymer composition 350 is positioned between the first substrate 100 and the second substrate 200 (S410).

As shown in FIG. 14, the liquid crystal polymer composition 350 may be injected into the space between the first substrate 100 and the second substrate 200 through an opened space in the sealant 500 using a vacuum filling apparatus 10. Here, the polymer 352 contained in the liquid crystal polymer composition 350 may include an ultraviolet ray curable resin or a thermal curable resin.

When the pressure of the space defined by the first substrate 100, the second substrate 200, and the sealant 500 decreases, the first substrate 100 and the second substrate 200 contact the liquid crystal polymer composition 350 contained in a liquid crystal accommodating unit 11, and the liquid crystal polymer composition 350 is injected into the space defined by the first substrate 100 and the second substrate 200 through the opening in the sealant 500 due to a capillary phenomenon and a pressure difference. After the liquid crystal polymer composition 350 is injected, the first substrate 100 and the second substrate 200 are spaced apart from the liquid crystal accommodating unit 11.

Then, the spacer 300 is formed (S510).

Figure 15:
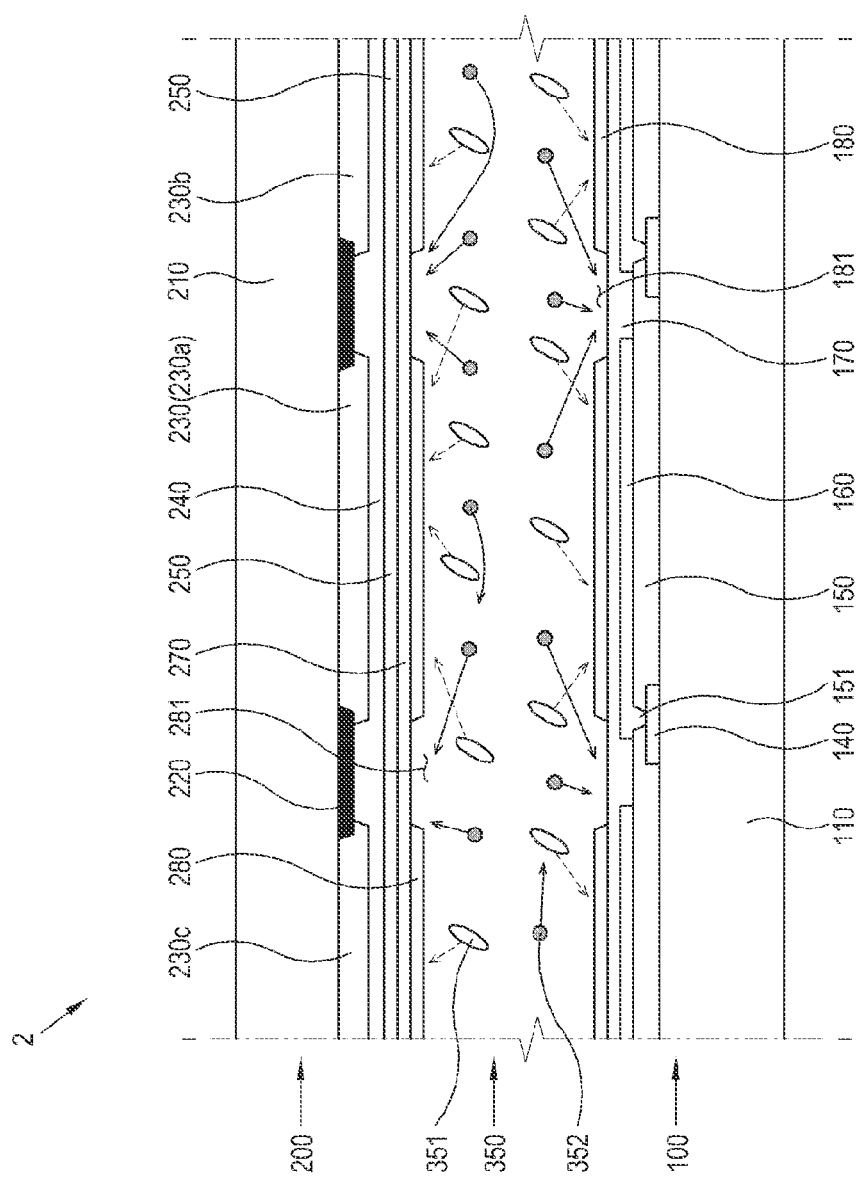

As shown in FIG. 15, the polymer 352 contained in the liquid crystal polymer composition 350 interposed between the first substrate 100 and the second substrate 200 moves toward the first exposing area 181 and the second exposing area 281 due to chemical affinity, and the liquid crystal molecules 351 move toward the first alignment layer 180 and the third alignment layer 280 due to chemical affinity.

Since the polymer 352 has greater chemical affinity for the first thin film 170 and the second thin film 270 than for the first alignment layer 180 and the third alignment layer 280, the polymer 352 moves toward the area where the first thin film 170 and the second thin film 270 are respectively exposed by the first exposing area 181 and the second exposing area 281.

Since the liquid crystal molecules 351 have greater chemical affinity for the first alignment layer 180 than for the first thin film 170, and have greater chemical affinity for the third alignment layer 280 than for the second thin film 270, the liquid crystal molecules 351 move toward the first alignment layer 180 and the third alignment layer 280.

Figure 16:
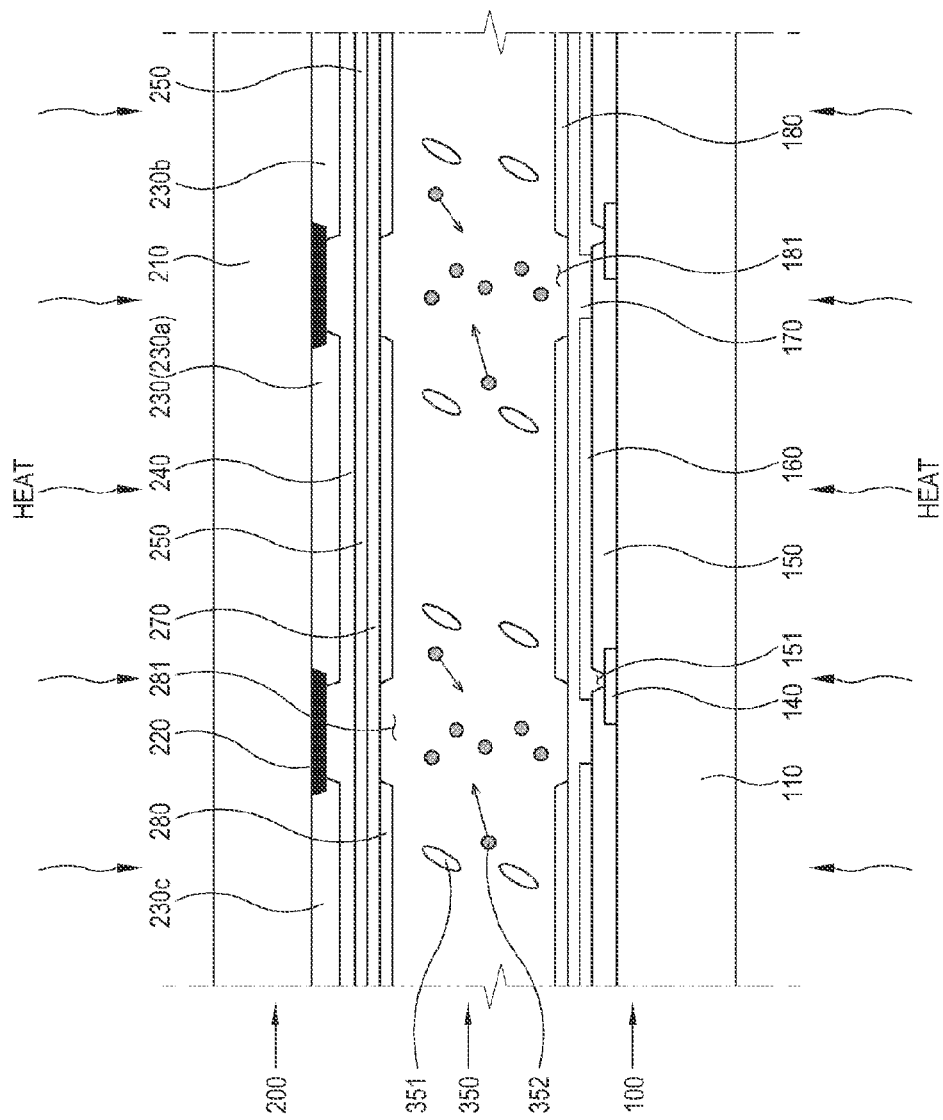

As shown in FIG. 16, after the polymer 352 becomes more concentrated in an area corresponding to the first exposing area 181 and the second exposing area 281 than in an area corresponding to the first alignment layer 180 and the third alignment layer 280, an ultraviolet ray or heat is supplied to the liquid crystal polymer composition 350 from an external part of at least one of the first substrate 100 and the second substrate 200.

The polymer 352 in the area corresponding to the first exposing area 181 and the second exposing area 281 is cured by the ultraviolet ray or heat supplied to the liquid crystal polymer composition 350, and the remaining polymer 352 in the area corresponding to the first alignment layer 180 and the third alignment layer 280 moves toward the polymer 352 in the area corresponding to the first exposing area 181 and the second exposing area 281 due to the chemical affinity between the vicinal polymers 352 to be cured.

As described above, the polymer 352 becomes concentrated at the first exposing area 181 and the second exposing area 281 to be cured to form the spacer 300. Here, the spacer 300 contacts surfaces of the first substrate 100 and the second substrate 200.

As described above, in the liquid crystal display device and the manufacturing method thereof according to the second exemplary embodiment, the second substrate 200 includes the third alignment layer 280 including the second exposing area 281 corresponding to the first exposing area 181 so that the polymer 352 contained in the liquid crystal polymer composition 350 may move toward the first exposing area 181 and the second exposing area 281 more rapidly than the in first exemplary embodiment, which may reduce the manufacturing time of the liquid crystal display device 2.

Also, since the second substrate 200 has greater chemical affinity for the polymer 352 of the liquid crystal polymer composition 350 to form the spacer 300, the spacer 300 may further fixedly contact the second substrate 200 in addition to the first substrate 100 so that the cell gap of the liquid crystal display device may be fixedly maintained.

Figure 17:
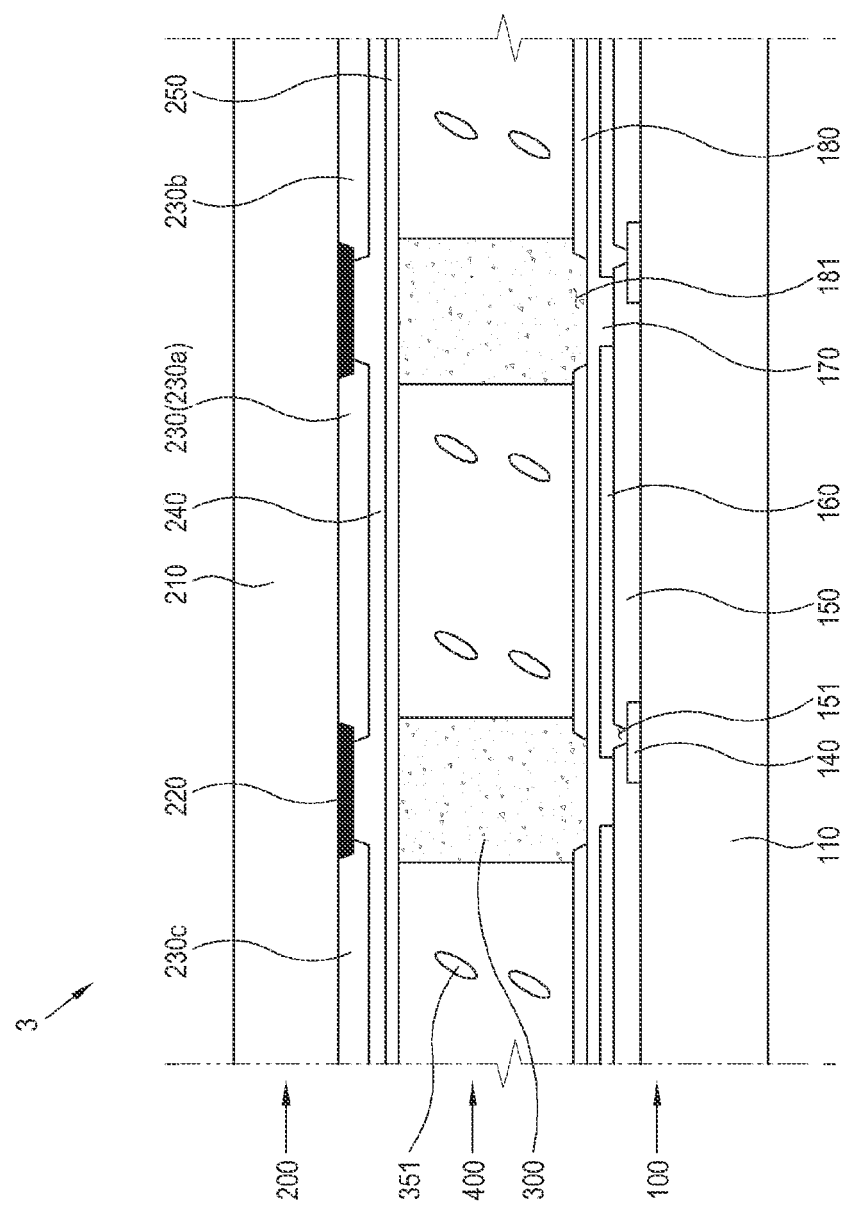
FIG. 17 is a sectional view of a liquid crystal display device according to a third exemplary embodiment of the present invention.

Hereinafter, a liquid crystal display device 3 according to the third exemplary embodiment of the present invention will be described by referring to FIG. 17.

The second substrate 200 includes a black matrix 220, a color filter 230, an over coat layer 240, and a common electrode 250 disposed on a second insulating substrate 210.

A first alignment layer 180 of a first substrate 100 determines an alignment direction of a liquid crystal layer 400.

The first alignment layer 180 may determine a horizontal alignment or a vertical alignment of the liquid crystal layer 400.

As described above, since the configuration of the liquid crystal display device 3 according to the third exemplary embodiment is simple as compared to the first exemplary embodiment and the second exemplary embodiment, the manufacturing cost of the liquid crystal display device 3 may be reduced, and a manufacturing time of the liquid crystal display device 3 may be reduced.

In the above exemplary embodiments, the spacer 300 may have a continuous lattice shape. Alternatively, the spacer 300 may have a dot shape, a honeycomb shape, or other shapes.

As described above, the exemplary embodiments of the present invention provide a liquid crystal display device that may stably maintain a cell gap and a manufacturing method thereof.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A manufacturing method of a liquid crystal display device, comprising:
    providing a first substrate comprising a first insulating substrate, a first thin film positioned on the first insulating substrate, and a first alignment layer positioned on the first thin film, the first alignment layer comprising a first exposing area that exposes the first thin film;
    providing a second substrate comprising a second insulating substrate and a second alignment layer that is disposed on the second insulating substrate;
    positioning a liquid crystal polymer composition on one of the first substrate and the second substrate, the liquid crystal polymer composition comprising a polymer having greater chemical affinity for the first thin film than for the first alignment layer, and a liquid crystal molecule having greater chemical affinity for the first alignment layer than for the first thin film;
    disposing one of the first substrate and the second substrate on the other of the first substrate and the second substrate; and
    curing the liquid crystal polymer composition to form a spacer after the polymer of the liquid crystal polymer composition becomes concentrated in an area corresponding to the first exposing area.

2. The method of claim 1, wherein the providing the second substrate comprises forming a second thin film having greater chemical affinity for the polymer than does the second alignment layer, the second thin film being positioned between the second insulating substrate and the second alignment layer, and
    the second alignment layer comprises a second exposing area through which the second thin film is exposed.

3. The method of claim 2, wherein the second exposing area corresponds to the first exposing area when one of the first substrate and the second substrate is disposed on the other of the first substrate and the second substrate.

4. The method of claim 1, wherein the spacer directly contacts the first substrate and the second substrate.

5. The method of claim 4, wherein the first exposing area has a lattice shape.

6. The method of claim 1, wherein the liquid crystal polymer composition is cured using at least one of an ultraviolet ray and heat.

7. A manufacturing method of a liquid crystal display device, comprising:
    providing a first substrate comprising a first insulating substrate, a thin film positioned on the first insulating substrate, and a first alignment layer positioned on the thin film, the first alignment layer comprising a first exposing area that exposes the thin film;
    providing a second substrate comprising a second insulating substrate;
    disposing the second substrate on the first substrate so that the first substrate and the second substrate face each other with a space therebetween;
    disposing a liquid crystal polymer composition in the space, the liquid crystal polymer composition comprising a polymer having greater chemical affinity for the thin film than for the first alignment layer, and a liquid crystal molecule having greater chemical affinity for the first alignment layer than for the thin film to the distanced space; and
    curing the liquid crystal polymer composition to form a spacer after the polymer of the liquid crystal polymer composition becomes concentrated in an area corresponding to the first exposing area.

8. The method of claim 7, wherein the providing the second substrate further comprises forming a second alignment layer on the second insulating substrate.

9. The method of claim 8, wherein providing the second substrate comprises forming a second thin film having greater chemical affinity for the polymer than does the second alignment layer, the second film being positioned between the second insulating substrate and the second alignment layer, and
    the second alignment layer comprises a second exposing area through which the second thin film is exposed.

* * * * *